United States Patent
Dändliker et al.

(10) Patent No.: US 6,225,617 B1
(45) Date of Patent: *May 1, 2001

(54) METHOD FOR GENERATING QUASI-SINUSOIDAL SIGNALS

(75) Inventors: René Dändliker, Corcelles; Marc Bidiville, Pully, both of (CH)

(73) Assignee: Logitech, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/039,164

(22) Filed: Mar. 13, 1998

Related U.S. Application Data (63) Continuation of application No. 08/478,191, filed on Jun. 7, 1995, now Pat. No. 5,729,009, which is a continuation-in-part of application No. 08/424,125, filed on Apr. 19, 1995, now Pat. No. 5,703,356, which is a continuation of application No. 08/199,982, filed on Feb. 18, 1994, now abandoned, which is a continuation of application No. 07/956,907, filed on Oct. 5, 1992, now Pat. No. 5,288,993.

(51) Int. Cl.$^7$ .............................. H01J 40/14; G01V 9/04
(52) U.S. Cl. ........................ 250/208.2; 250/214 R; 250/221; 250/231.13; 345/158
(58) Field of Search .................... 250/208.1, 208.2, 250/208.5, 214.1, 214 R, 215, 221, 222.1, 229, 331.12, 231.13, 231.14, 231.16, 231.18; 345/163, 164, 165, 166, 167, 156, 157, 158, 179; 341/13, 14, 31, 5, 6

(56) References Cited

U.S. PATENT DOCUMENTS

| | | | | |
|---|---|---|---|---|
| 4,546,347 | * | 10/1985 | Kirsch | 850/237 R |
| 4,720,631 | * | 1/1988 | Lapeyre | 250/237 G |
| 4,751,380 | * | 6/1988 | Victor et al. | 250/221 |
| 4,794,384 | * | 12/1988 | Jackson | 345/166 |
| 4,799,055 | * | 1/1989 | Nestler et al. | 345/166 |
| 4,920,260 | * | 4/1990 | Victor et al. | 250/221 |
| 5,015,070 | * | 5/1991 | Montgomery et al. | 250/221 |
| 5,288,993 | * | 2/1994 | Bidiville et al. | 250/22.1 |
| 5,703,356 | * | 12/1997 | Bidiville et al. | 250/221 |
| 5,729,009 | * | 3/1998 | Dändliker et al. | 250/208.2 |
| 6,031,218 | | 2/2000 | Piot et al. | 250/208.2 |

FOREIGN PATENT DOCUMENTS

| | | | |
|---|---|---|---|
| 0 420 172 A1 | 4/1994 | (EP) | G01P/3/36 |
| 0 614 086 A1 | 9/1994 | (EP) | G01P/3/36 |

OTHER PUBLICATIONS

Anonymous, "Bucket Brigade Charge Packet Diverter. Jan. 1976", IBM Technical Disclosure Bulletin; vol 18, No. 8, Jan. 1, 1976.

* cited by examiner

*Primary Examiner*—John R. Lee
(74) *Attorney, Agent, or Firm*—Fenwick & West LLP

(57) ABSTRACT

A method for generating quasi-sinusoidal signals includes illuminating an object capable of diffusely scattering light, focusing a portion of the scattered light on a multi-element sensor to form an image, and matching the image size to the size of the sensor elements.

15 Claims, 7 Drawing Sheets

METHOD FOR GENERATING QUASI-SINUSOIDAL SIGNALS

RELATED APPLICATION

This application is a continuation of U.S. patent application Ser. No. 08/478,191, filed Jun. 7, 1995, and now U.S. Pat. No. 5,729,009, which is a continuation-in-part of U.S. patent application Ser. No. 08/424,125, filed Apr. 19, 1995, now U.S. Pat. No. 5,703,356, which is a continuation of U.S. patent application Ser. No. 08/199,982, filed Feb. 18, 1994, now abandoned, which is a continuation of U.S. patent application Ser. No. 07/956,907, filed Oct. 5, 1992, and now U.S. Pat. No. 5,288,993, each of which is assigned to Logitech, Inc., the assignee of the present application.

INCORPORATION BY REFERENCE

Incorporated herein by reference is the entire disclosure of U.S. patent application Ser. No. 08/424,125, filed Apr. 19, 1995 now U.S. Pat. No. 5,703,356 and assigned to Logitech, Inc., the assignee of the present invention.

FIELD OF THE INVENTION

The present invention relates to optical pointing devices for use with personal computers, workstations and other computing devices, and more particularly relates to optical pointing devices having no mechanically moving parts and which operate without the need for a specially patterned surface.

BACKGROUND OF THE INVENTION

Pointing devices, such as mice and trackballs, are well known peripherals for personal computers and workstations. Such pointing devices allow rapid relocation of the cursor on a display screen, and are useful in many text, database and graphical programs. Perhaps the most common form of pointing device is the electronic mouse; the second most common may well be the trackball.

With a mouse, the user controls the cursor by moving the mouse over a reference surface; the cursor moves a direction and distance proportional to the movement of the mouse. Although some electronic mice use reflectance of light over a reference pad, and others use a mechanical approach, most prior art mice use a ball which is on the underside of the mouse and rolls over the reference surface (such as a desktop) when the mouse is moved. In such a prior art device, the ball contacts a pair of shaft encoders and the rotation of the ball rotates the shaft encoders, which historically includes an encoding wheel having a plurality of slits therein. A light source, often an LED, is positioned on one side of the encoding wheel, while a photosensor, such as a phototransistor, is positioned substantially opposite the light source. Rotation of the encoding wheel therebetween causes a series of light pulses to be received by the photosensor, by which the rotational movement of the ball can be converted to a digital representation useable to move the cursor.

Although such a prior art approach has worked well for some time, with high quality mice and trackballs providing years of trouble-free use, the mechanical elements of such pointing devices necessarily limit the useful life of the device.

Optical mice which illuminate a reference pad, while having few or no mechanical parts, have historically been limited due to the need for the reference pad to have a regular pattern, as well as many other limitations.

While optical mice in the prior art have typically required a reference pad, two methods are known in the general optical art for detecting movement of a scattering surface illuminated by coherent illumination. The first such approach employs illumination of the surface with two light sources and using a single detector; the second includes illumination with only a single beam but using a grating filter in front of a single detector. In both these cases, forward and backward movement cannot be distinguished, in what is referred to as sign ambiguity. Likewise, in both case the detection is sensitive to one direction of movement in the plane. Further, in the case of the first prior art approach, the two illuminating beams have to be rotated to be sensitive to another direction of movement; that is, for each direction of movement an independent detection system of illuminating beams and detector has to be used. In the case of the second prior art approach, the grating filter in front of the detector has to be rotated to be sensitive to another direction of movement.

There has therefore been a need for a device which includes a detection system which is sensitive to different directions of movement without alteration of the detection system.

SUMMARY OF THE INVENTION

The present invention overcomes substantially all of the foregoing limitations of the prior art, and provides an improved method and apparatus for optical detection of motion of a detector relative to an irregularly speckled or patterned surface, such as the surface of a common office desk. The desk surface has no special characteristics except that it produces a sufficient amount of diffusely scattered light in response to coherent illumination. In particular, when illuminated by coherent light, for example a laser diode, the illuminated surface has a granular appearance which appears essentially as randomly distributed light and dark speckles. A specially configured detector is combined with novel signal processing techniques to decode bidirectional movement of the speckle pattern. Alternatively, the specially configured detector of the present invention can be combined with a printed pattern on a pad or ball in order to generate the speckles or dots without the requirement for a coherent light source—i.e., a simple diode could be used.

In particular, the detection system of the present invention produces sinusoidal signals in quadrature for forward-backward detection using specially configured photodetectors. The detection system is sensitive to different directions of movement by the use of differently oriented detectors which use the same coherent illumination of the surface. More specifically, a first significant aspect of the invention is a quadruple comb array of photodetectors which senses a component (either x or y) of the movement and produces quasi-sinusoidal quadrature signals. The sinusoidal properties of the signals produced by the photodectors are obtained through optical matching by which the optical system is matched to the period of the photodetector array. Movement of the detector relative to the surface is then detected by a bidirectional counter in a manner similar to a rotational encoder. By combining a plurality of such quadrature encoders at different angles, motion in both the x and y directions can be detected. A microprocessor can be used to combine the signals from the various detectors.

It is therefore one object of the present invention to provide a pointing device which optically detects movement relative to a conventional speckled or patterned surface such as the surface of a desk.

It is another object of the present invention to provide a comb photodetector which is capable of generating quasi-quadrature signals in response to relative motion between the array and a surface capable of diffusely scattering light.

It is a further object of the present invention to provide a pointing device which uses one or more comb photodetectors to detect motion of the pointing device relative to a surface capable of diffusely scattering light.

It is a still further object of the present invention to provide a pointing device which uses a comb photodetector together with a non-coherent light source and a patterned surface to detect relative motion between the photodetector and the patterned surface.

These and other objects of the present invention may be better appreciated from the following Detailed Description of the Invention, taken in combination with the accompanying Figures.

DETAILED DESCRIPTION OF THE INVENTION

Figure 1:
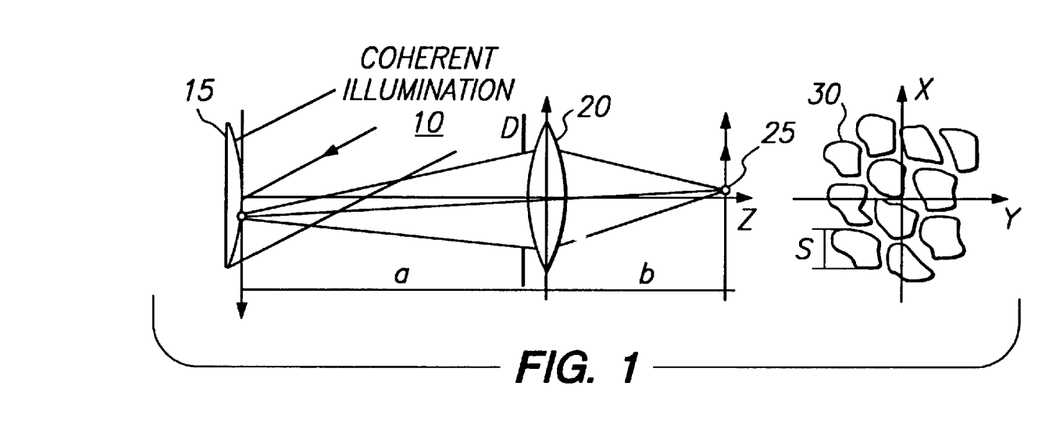
FIG. 1 shows in simplified form an optical system according to the present invention.

Referring first to FIG. 1, an optical system according to the present invention is shown in simplified form. In a presently preferred embodiment, a coherent light source 10, such as a laser diode or similar device, illuminates a surface 15 with coherent light. The surface, which may be the surface of a desk or a piece of conventional paper diffusely scatters light, some of which passes through an aperture D and thence through a lens 20. The light is focused by the lens 20 onto a sensor 25, where a speckled image 30 is formed. The image 30 comprises a series of spots on a contrasting background, such as dark spots on a light background, essentially of the same type as described in U.S. patent application Ser. No. 08/424,125, now U.S. Pat. No. 5,703, 356 noted above. The distance from the surface 15 to the lens 20 is indicated by the dimension "a", while the distance from the lens to the detector 25 is indicated by the dimension "b". In this arrangement, the average speckle size "s" is determined by the wavelength $\lambda$, the lens aperture D and the image distance "b" through the relation $s \approx \lambda b/D$. More particularly, in an exemplary embodiment the value of "a" varies between 5 mm to 20 mm, while the value of "b" varies between 5 mm and 20 mm, the value of D varies between 0.2 mm and 2 mm, while the value of "s" varies between 10 $\mu$m and 100 $\mu$m and the value of $\lambda$ varies between 600 nm and 990 nm.

In an alternative embodiment of the device shown in FIG. 1, a coherent light source is not required, and a patterned or speckled surface is used to create the speckled image 30 on the sensor 25. The sensor 25 is described in greater detail in FIG. 2A.

Figure 2A:
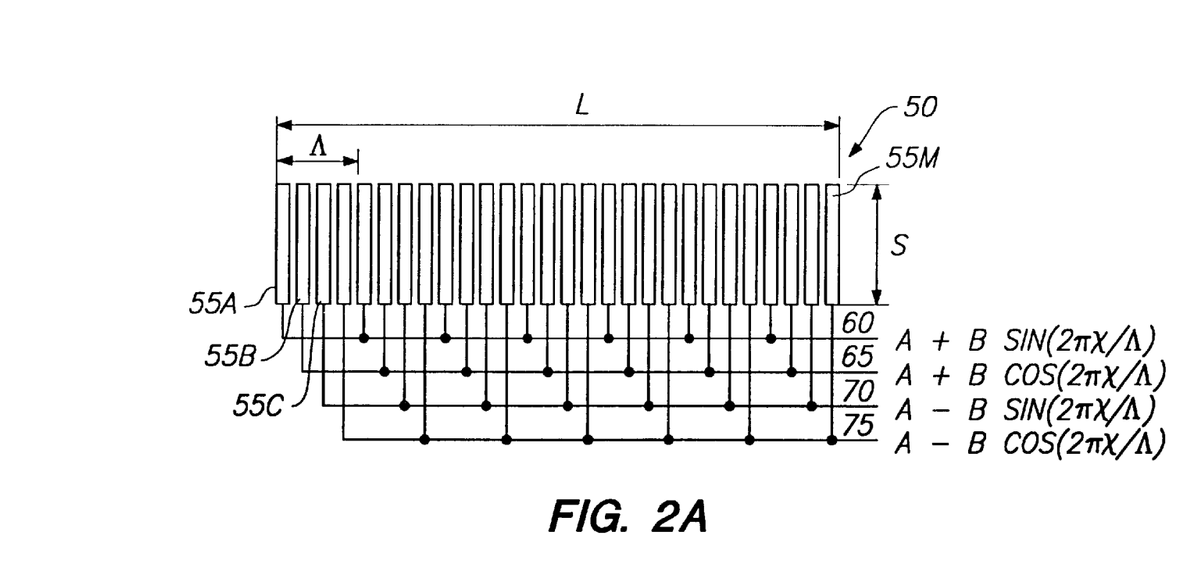
FIG. 2A shows a comb photodetector design according to the present invention.

Referring next to FIG. 2A, a comb photodetector which is a significant feature of the present invention is shown. In particular, the comb photodetector 50 comprises an array of photodetector elements 55A–55n arranged so that the output of every fourth element is connected together, forming what is essentially a quadruple array. The array may have an overall length L, a height S, and a distance $\Lambda$ from the first to the fourth element, essentially forming the period of the array. For an exemplary embodiment, typical values of $\Lambda$ vary between 20 $\mu$m and 100 $\mu$m, while the value of L varies between 0.2 mm and 5 mm, and the value of S varies between 0.1 mm and 1 mm.

Figures 2B, 3A:
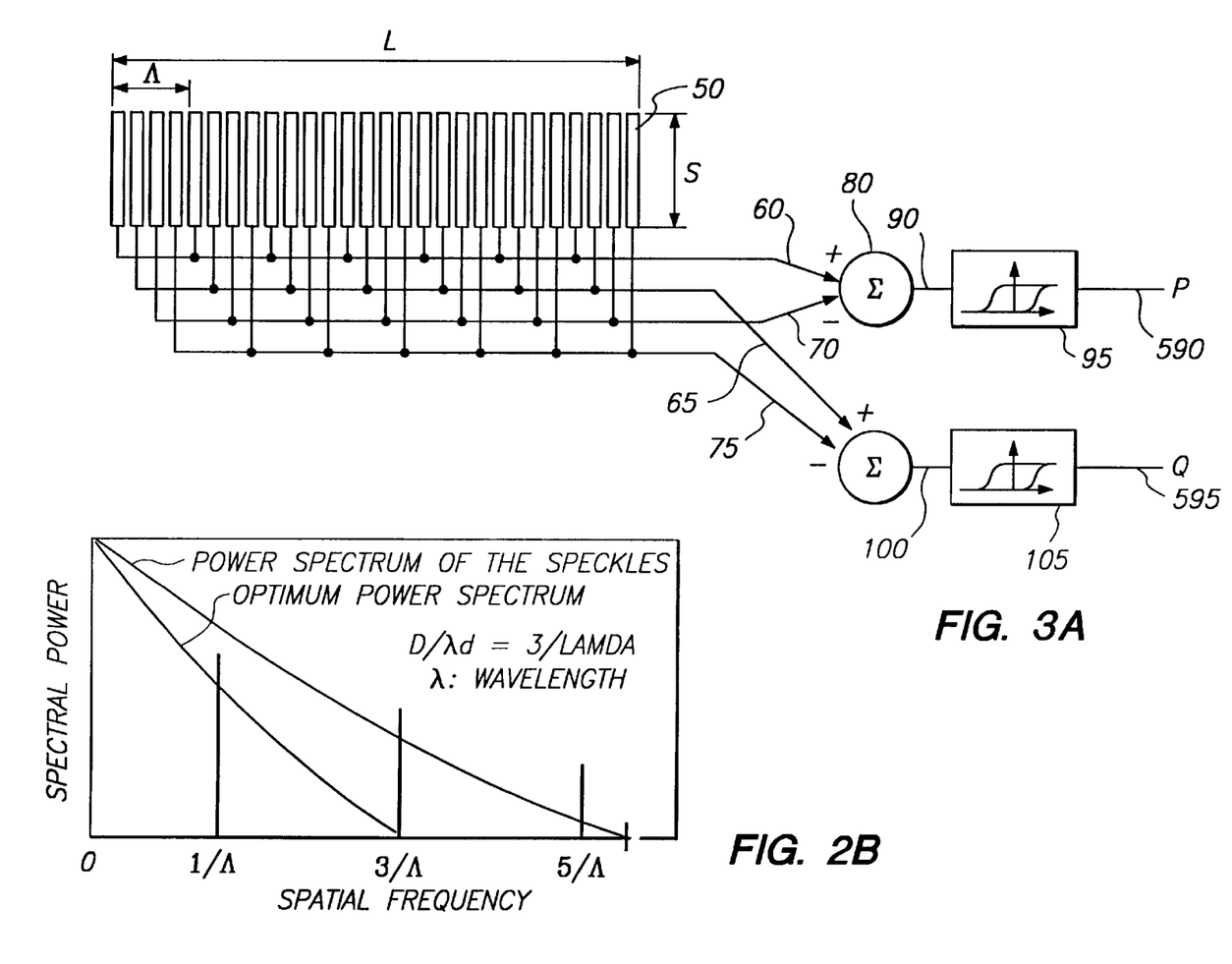
FIG. 2B shows a plot of spatial frequency versus spectral power for the comb photodetector of FIG. 2A.
FIG. 3A shows in simplified schematic block diagram form the use of the comb photodetector of FIG. 2A as a detector for sensing motion in one dimension.

The output 60 of the first group of elements may be represented as $A+B \sin(2\pi x/\Lambda)$, while the output 65 of the second group can be represented as $A+B \cos(2\pi x/\Lambda)$, while the output 70 of the third group can be represented as $A-B \sin(2\pi x/\Lambda)$, and the output 75 of the fourth group can be represented as $A-B \cos(2\pi x/\Lambda)$. The spectral and statistical properties of the detector signal depend on the size "s" of the speckles compared with the geometrical dimensions of the detector array. The comb array detector 50 acts as a spatial frequency filter where the filter characteristic for the differential detector signal $[A+B \sin(2\pi x/\Lambda)]-[A-B \sin(2\pi x/\Lambda)]=2B \sin(2\pi x/\Lambda)$ is shown in FIG. 2B. It can be seen to consist of peaks at the odd (1st, 3rd, 5th, . . . ) orders of the spatial frequency $1/\Lambda$ corresponding to the period $\Lambda$ of the array 50. The power spectrum of the spatial distribution of the intensity in the speckle pattern is given by the autocorrelation function of the lens aperture D, which is shown in FIG. 2B for a circular aperture, and the image distance "b". The correlation is lost for movements in both the x and y directions when an entirely new set of speckles appears within the detector area.

The sinusoidal properties of the differential detector signal $[A+B \sin(2\pi x/\Lambda)]-[A-B \sin(2\pi x/\Lambda)]=2B \sin(2\pi x/\Lambda)$ are obtained through optical matching which is one of the significant features of the present invention. Optical matching is achieved when the power spectrum of the spatial distribution of the intensity in the speckle pattern has no power at spatial frequencies equal to the odd multiples of the spatial frequency $1/\Lambda$, except at frequency $1/\Lambda$. Since the power spectrum of the speckle pattern has no energy at frequencies above $D/\lambda b$, optical matching is achieved when $D/\lambda b \leq 3/\Lambda$, typically by choosing the aperture $D=3b\lambda/\Lambda$.

The operation of the array 50 to generate quasi-quadrature signals may be better appreciated from FIG. 3A. The array 50 is again shown as having four current outputs as in FIG. 2A. In this instance, the first output 60 is shown connected to the positive input of a current summing circuit 80, while the third output 70 is shown connected to the inverting or negative input to the summing circuit 80. Similarly, the second output 65 is connected to the positive input of a current summing circuit 85, while the fourth output 75 is connected to the negative or inverting input to the summing circuit 85.

The output 90 of summing circuit 80 is provided to a current comparator 95, while the output 100 of the summing circuit 85 is provided to a current comparator 105. The current comparators 95 and 105 each have a symmetrical hysteresis around zero and a voltage output of 0 V or 5 V. The output of the comparator 95 is the in-phase signal P, while the output of the comparator 105 is the quadrature signal Q.

Figure 3B:
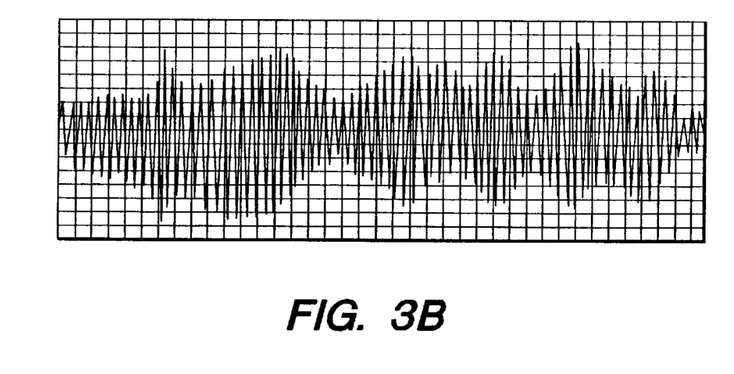
FIG. 3B shows a typical waveform produced at each of the summing points of the circuit of FIG. 3A.

The signals 90 and 100 represent the differential current outputs of the various phases of the detector array 50. At any time, the current is the response of the sensor to the optically filtered speckle pattern. When the pattern is moving at velocity "v" with respect to the sensor, a sinewave-like signal is generated at a temporal frequency (in hertz) of v/Λ. A characteristic waveform is shown in FIG. 3B. As a result, an estimate of the displacement may be obtained by counting the number of periods the signal achieves during displacement. The quasi-sinewave nature of the signal shown in FIG. 3B is due to the optical matching discussed above which reduces the number of frequency lines to a single line.

It is presently believed that the best results are given when the length L of the array is chosen so that the sinusoidal signal has a correlation length of several periods, for example L>5Λ, and in an exemplary embodiment may have L=25Λ. The width or height S of the detector array 50 is chosen so that the correlation of the sinusoidal signal is not reduced too much by a transverse displacement component; i.e., typically S/L≧0.1. Finally, the size of the illuminated spot on the surface 15 is chosen so that its image corresponds best to the detector array size in the image.

Figure 3C:
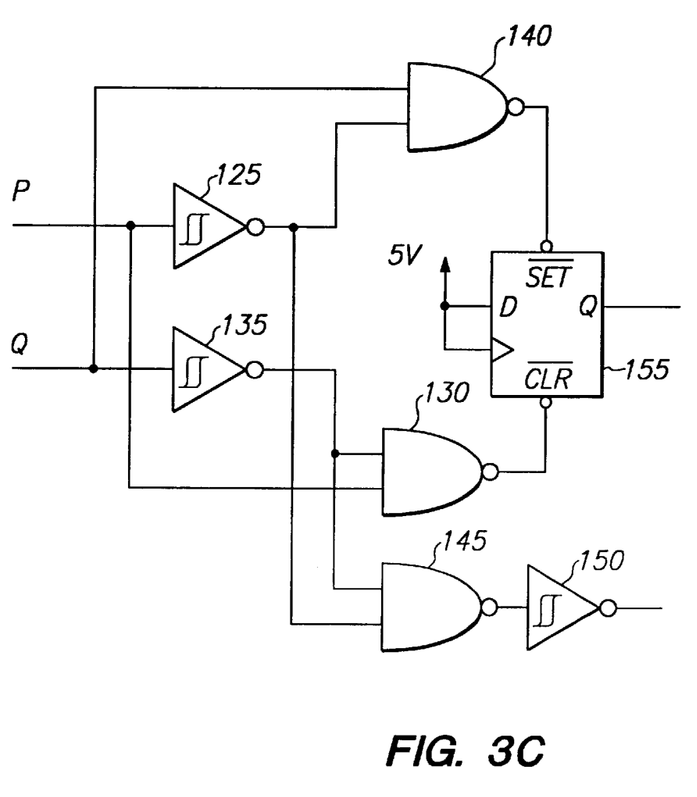
FIG. 3C shows a quadrature encoder suitable for use with the circuit of FIG. 3A.

The purpose of the comparators 95 and 105 is to generate digital signals from the sinewave-like signals shown in FIG. 3B, which facilitates interfacing the output signals P and Q to digital counters for measurement of period count. The phase and quadrature signals (P and Q) may be combined, as shown in FIG. 3C. More specifically, the signal P is provided to the input of a first Schmitt trigger 125 and also to one input of a NAND gate 130. The signal Q is provided to the input of a second Schmitt trigger 135 and also to one input of a NAND gate 140. The output of the Schmitt trigger 125 provides the second input to the NAND gate 140 and also provides a first input to another NAND gate 145. The output of the Schmitt trigger 135 provides the second input to the NAND gate 130 and also provides the second input to the NAND gate 145. The output of the NAND gate 145 provides the input to a third Schmitt trigger 150, the output of which is a COUNT signal. The output of the NAND gate 130 provides an inverted CLEAR signal to a D flipflop 155, the D and clock inputs of which are tied high. The output of the NAND gate 140 provides an inverted SET signal to the flipflop 155. The noninverting output Q of the flipflop 155 provides and indication of direction, or UP/DOWN. The combination of the COUNT and UP/DOWN signals may be used to drive a digital up/down counter in an otherwise conventional manner.

Figure 4:
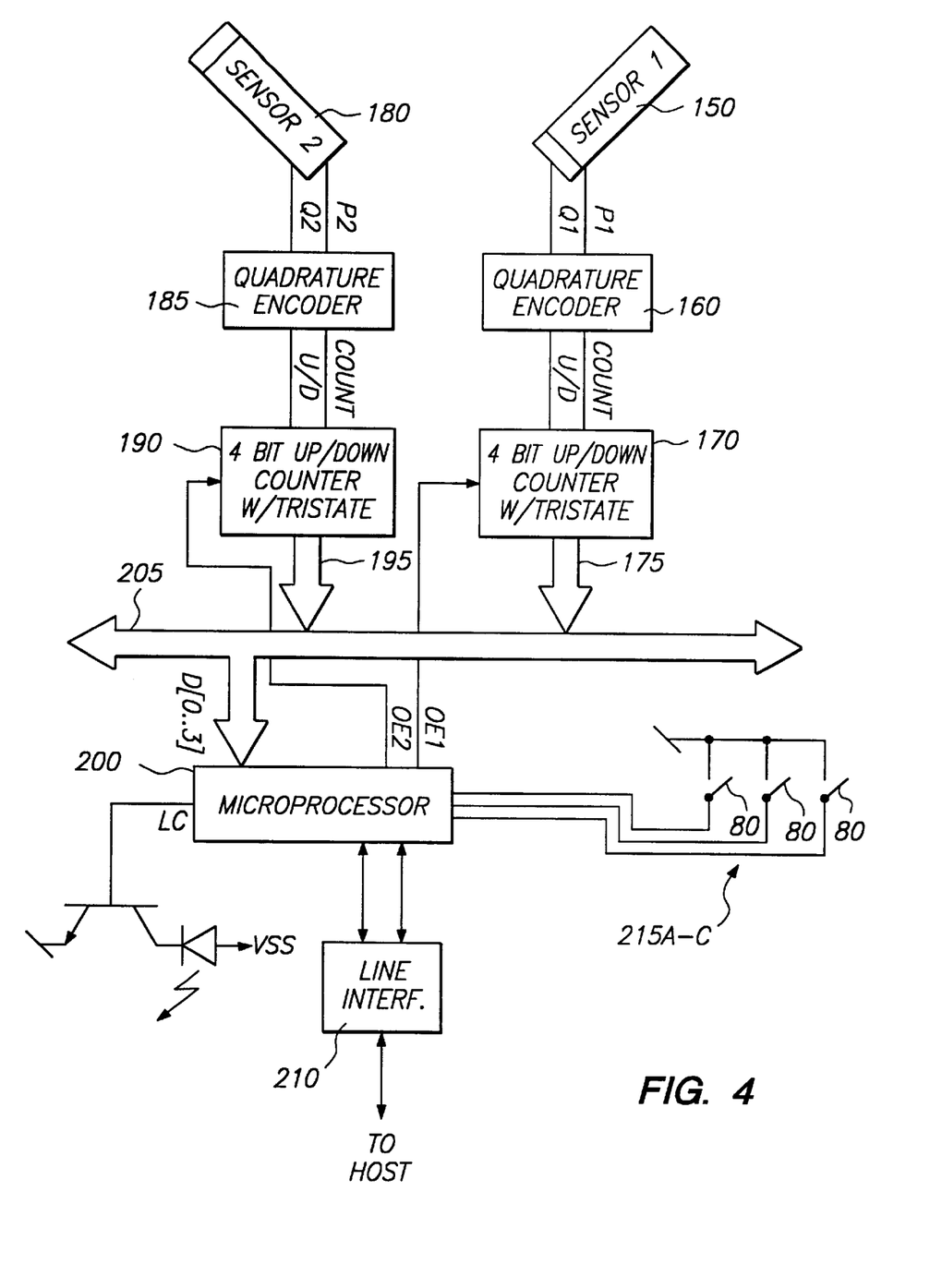
FIG. 4 shows in simplified schematic block diagram form the use of two comb photodetectors in a detector system to detect motion in two dimensions.

Since one quadrature array 50 is intended to detect displacement only along its length, multiple arrays 50 are required to detect motion of the speckled surface in two dimensions. In this regard, FIG. 4 shows in schematic block diagram form an implementation of the present invention using two photodetector arrays (arranged at ninety degrees relative to one another) to detect motion in two dimensions, with one array to detect motion in the x direction and the second to detect motion in the y direction. In particular, a first array 150 supplies signals P1 and Q1 to a quadrature encoder 160 such as shown in FIG. 3C. The UP/DOWN and COUNT signals from the encoder 160 control a four-bit up/down counter 170, which has a tri-state output 175. Similarly, a second array 180 supplies P2 and Q2 to a quadrature encoder 185, which supplies UP/DOWN and COUNT inputs to another four bit up/down counter 190. The counter 190 has a tri-state output 195.

The microprocessor 200 can selectively read, on a periodic basis, the values of the counters 170 and 190 by selectively enabling signals OE1 and OE2, to cause the output value of the respective counter appear on the tri-state bus 205. The values of the counters 170 and 190 are combined in accordance with the algorithm described below to generate a displacement report, which can then be formatted in any suitable manner for transmission to a host, such as RS232, PS/2 or ADB. Communication with the host is facilitated through a line interface 210, which typically provides for bidirectional communication. The microprocessor 200 can also control the switching of the LED 10 (FIG. 1), as well as read the value of switches 215A–C. The microprocessor 200 typically reads the counters 170 and 190 frequently enough to avoid overflow of the counters.

The algorithm for combining the values of the counters 170 and 190 involves determining the difference, over time, in the values of the respective counters. Thus, the variable C1 represents the current value of the counter 170, while the variable C2 represents the current value of the counter 190. The value $C1_{old}$ represents the previous value from counter 170, while the value of $C2_{old}$ represents the previous value from counter 190. The value ΔC1 is the difference between C1 and $C1_{old}$ and represents the displacement from sensor 1, while the value ΔC2 is the difference between C2 and $C2_{old}$, and represents the displacement from sensor 2.

The value Δx represents accumulated displacement in direction x, while Δy represents accumulated displacement in direction y. This leads to $$\Delta x = \Delta x + \Delta C1$$

and $$\Delta y = \Delta y + \Delta C2.$$

The total displacement reported to the host is $R_x$ and $R_y$, where $R_x = \Delta x/N$ and $R_y = \Delta y/N$, where N is typically on the order of eight to reduce resolution to an acceptable range. After transmission, the accumulators Δx and Δy are updated such that $$\Delta x = \Delta x \bmod N$$

and $$\Delta y = \Delta y \bmod N.$$

Figure 5A:
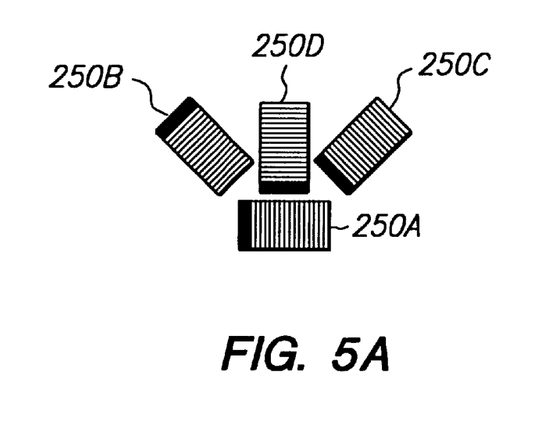
FIGS. 5A–5C shows alternative arrangements of photodetectors, including one in which multiple images of the same spot are detected.
Figure 5B:
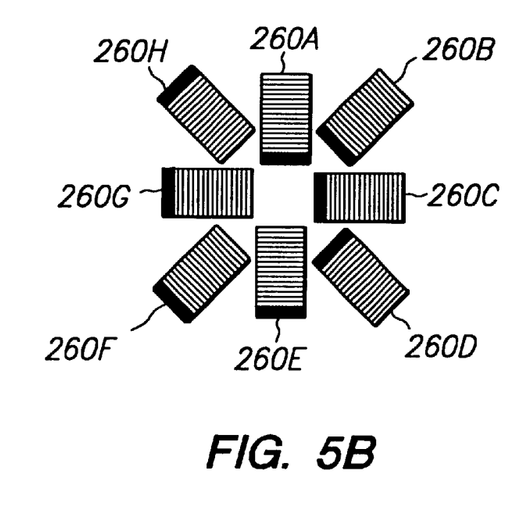
Figure 5C:
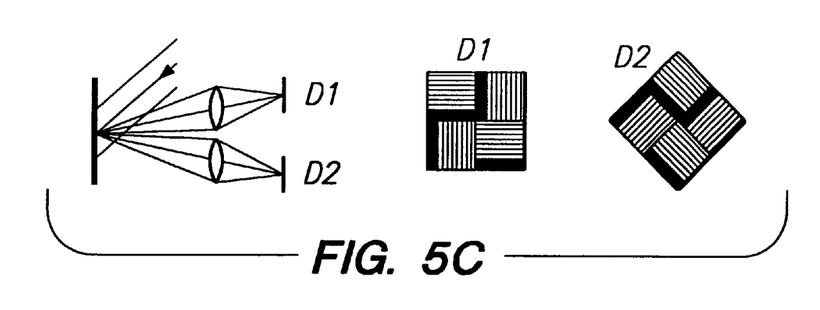

While the two sensor arrangement of FIG. 4 is an acceptable implementation of the present invention in at least some instances, somewhat better performance may be expected in other instances by the use of more than two photodetector arrays. For example, two additional oblique sensors is presently believed to provide better tolerance to momentary fadeout of the sensor signals. Such fadeout can translate into underestimation of the displacements, since fadeout means the signal does not overcome the hysteresis of the comparators 95 and 105 (FIG. 3A), which results in fewer counts. FIGS. 5A–5C thus illustrate alternative arrangements which use a plurality of detectors 50. For example, FIG. 5A shows four photodetector arrays 250A–D, with the sensor front end indicated by a thicker black line. Similarly, FIG. 5B shows eight arrays 260A–260H, with the front end again indicated by a thicker black line. In addition, FIG. 5C shows the use of multiple images from a single light source, supplied to multiple detectors D1 and D2, with the arrangement of each detector also shown including a thicker black line indicated the front.

Figure 6:
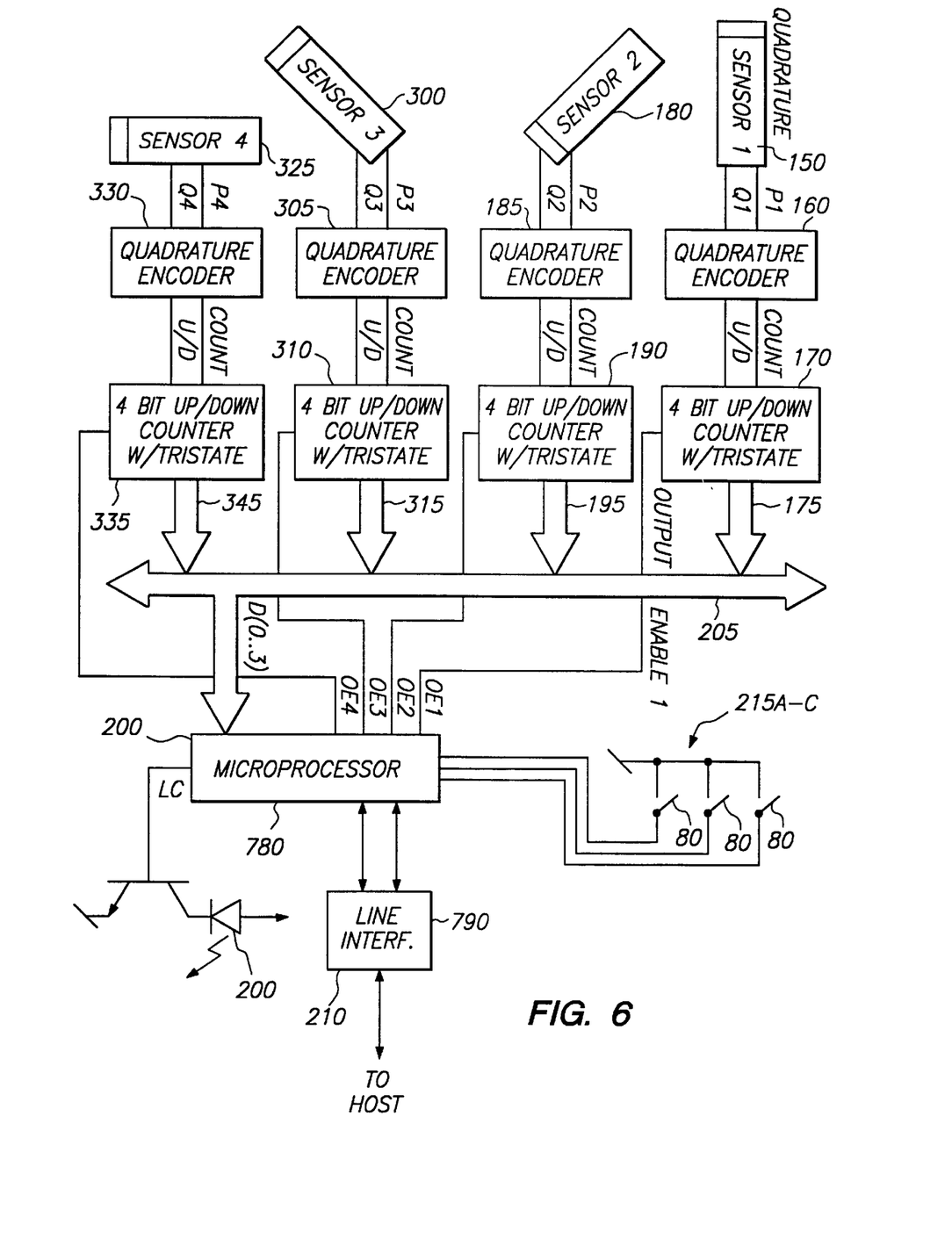
FIG. 6 shows in schematic block diagram form the use of four comb photodetectors for improved detection of motion in two dimensions.

Referring next to FIG. 6, an implementation of the four sensor arrangement of FIG. 5A is shown and can be seen to be an expansion of FIG. 4. Like devices are shown with like reference numerals. The third sensor 300 supplies signals P3 and Q3 to a quadrature encoder 305, which in turn supplies UP/DOWN and COUNT signals to a four bit up/down counter 310 having a tri-state output 315. The fourth sensor 325 similarly supplies P4 and Q4 signals to another quadrature encoder 330, which again supplies UP/DOWN and COUNT signals to a fourth four bit up/down counter 335 with a tri-state output 345. The microprocessor 200 now includes lines OE3 and OE4, in addition to lines OE1 and OE2 shown in FIG. 4, which allows the processor 200 to selectively address the counters 310 and 335, thereby placing their counts on the bus 205.

The algorithm for incorporating the input from the additional sensors is a straightforward expansion of that discussed above in connection with FIG. 4. Thus, C3 represent the value from counter 3, and C4 represents the value from counter 4, while $C3_{old}$ represents the previous value of C3 and $C4_{old}$ represents the previous value of C4. $\Delta C3$ is thus C3 minus $C3_{old}$, and $\Delta C4$ is thus C4. minus $C4_{old}$. Likewise, $$\Delta x = \Delta x + \Delta C1 + \Delta C2 + \Delta C3$$

and $$\Delta y = \Delta y + \Delta C4 + \Delta C3 - \Delta C2.$$

It will be understood that displacement is a weighted average from the readings of the counter C1 through C4. It should also be noted that displacement in the y direction yields no change in the value of $\Delta x$ since the displacements from sensors 2 and 3 (250B and 250C, respectively) cancel out. The same is also true for displacement in the x direction when reading $\Delta y$. The reports $R_x$ and $R_y$ are calculated in the same way as for FIG. 4, as are the updates of $\Delta x$ and $\Delta y$.

Figure 7A:
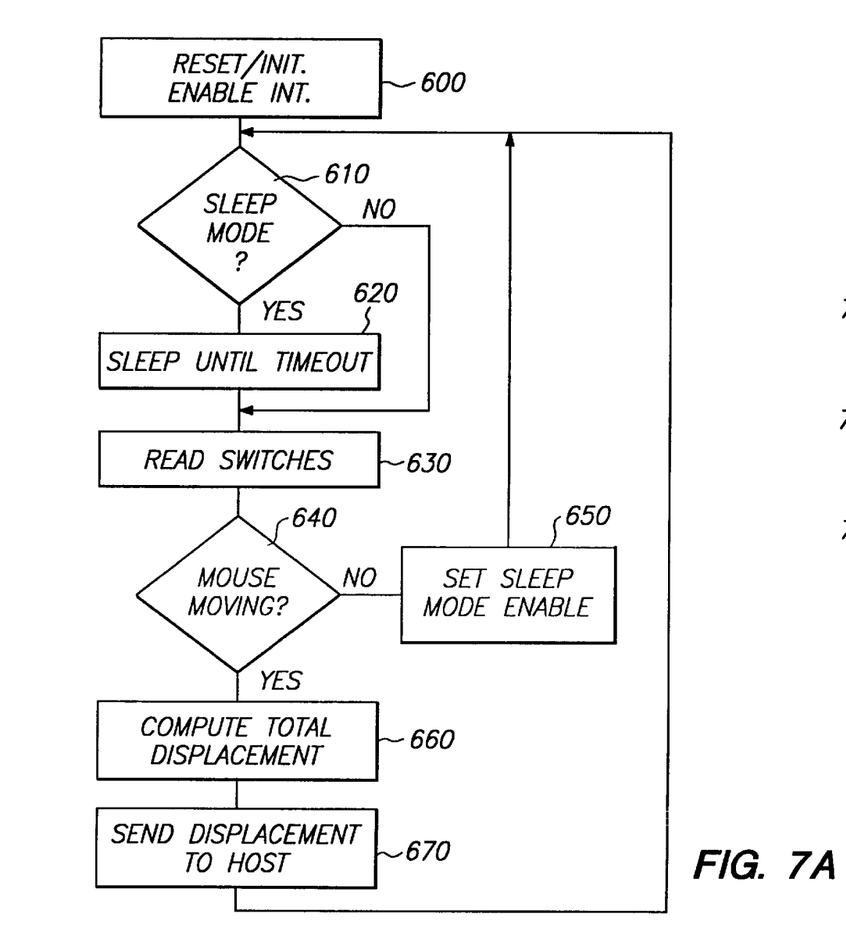
FIGS. 7A and 7B show in flow diagram form the operation of a mouse in accordance with the present invention.
Figure 7B:
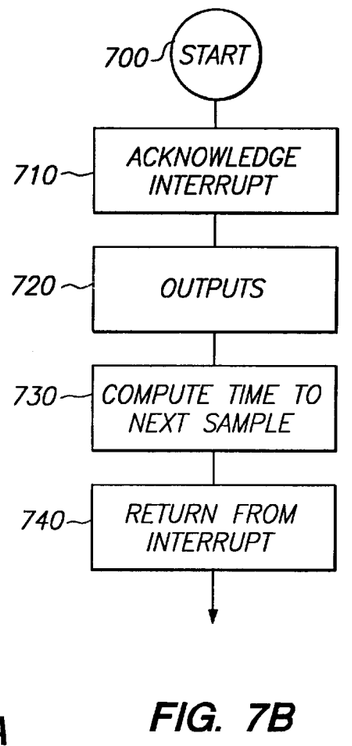

Referring next to FIGS. 7A–7B, the firmware for operation of a mouse or other pointing device in accordance with the present invention may be better understood. In particular, the process starts at step 400 by resetting and initializing, and enabling interrupts. The process continues at step 410 by determining whether sleep mode is appropriate; if yes, the electronics go into sleep mode at step 420 until a displacement is detected in a periodic interrupt routine or a timeout occurs. If not, the process skips to step 430 and the switchs 215A–C are read. The process continues at step 440 by determining whether the mouse is moving. If not, sleep mode is enabled at step 550; if the mouse is moving, total displacement is computed at step 650 and that displacement is sent to the host at step 670. The process then loops to step 610.

Similarly, in FIG. 7B, the periodic interrupt service routine can be better understood. The interrupt service routine is accessed at step 500 whenever a timer function from the microprocessor generates an interrupt, although other methods of generating an interrupt are also acceptable in at least some embodiments. The process to step 510 where the interrupt is acknowledged. The process then moves to step 520 where the outputs of the four counters are obtained, the $\Delta x$ and $\Delta y$ values are updated, and where a non-zero computed displacement brings the system out of the sleep mode. The process then moves to step 530, where the time until the next interrupt is computed. Finally, the process returns from the interrupt at step 540.

From the foregoing, it will be appreciated that a new and novel design has been disclosed for an optical pointing device having no mechanical moving parts but still capable of operation on a surface having suitable diffuse scattering of a coherent light source.Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A system for generating first and second quasi-sinusoidal signals comprising:
   a radiation source for transmitting radiation toward a surface of an object that diffusely reflects radiation, said radiation being one of ultraviolet radiation, visible radiation, and infrared radiation;
   an aperture, having an opening that is disposed to receive said reflected radiation, for enabling some of said reflected radiation to pass through said opening;
   a lens, disposed to receive said reflected radiation that has passed through said opening, for focusing said reflected radiation to form an image having light and dark portions;
   a detector array, disposed to receive said image, said detector array having at least four detector elements for receiving said image and filtering said image according to a spatial frequency, said detector array generating four phase signals; and
   a signal processing unit, disposed to receive said four phase signals, for generating two quasi-sinusoidal signals representing a direction and a distance in a first direction;
   wherein said aperture and said lens are substantially optically matched with said detector array.

2. The system of claim 1 wherein said optical matching substantially eliminates signals generated by said detector array at multiples of said spatial frequency excluding said spatial frequency.

3. The system of claim 2, wherein said spatial frequency is the inverse of the period of said detector array.

4. The system of claim 1, wherein said radiation source transmits non-coherent light.

5. The system of claim 4, wherein a primary frequency of said radiation source is in a visible frequency spectrum.

6. The system of claim 4, wherein a primary frequency of said radiation source is in a non-visible frequency spectrum.

7. The system of claim 1, wherein said surface has a pattern of areas that appear light and dark at said detector array when illuminated by said radiation.

8. The system of claim 7, wherein said pattern is random.

9. The system of claim 1, further comprising:
   a second aperture, having an opening that is disposed to receive said reflected radiation, for enabling some of said reflected radiation to pass through said opening;
   a second lens, disposed to receive said reflected radiation that has passed through said second aperture, for focusing said reflected radiation to form a second image;
   a second detector array, disposed to receive said second image, said second detector array having at least four detector elements for receiving said second image and filtering said second image according to a spatial frequency, said second detector array generating four phase signals; and a second signal processing unit, disposed to receive said four phase signals from said second detector array, for generating two quasi-sinusoidal signals representing a direction and a distance in a second direction;

wherein said second aperture and said second lens are substantially optically matched with said second detector array.

10. The system of claim 9 wherein said optical matching substantially eliminates signals generated by said second detector array at odd multiples of said spatial frequency excluding said spatial frequency.

11. The system of claim 9, wherein said surface has a pattern of areas that appear light and dark at said detector array when illuminated by said radiation.

12. The system of claim 11, wherein said pattern is random.

13. A method for generating first and second quasi-sinusoidal signals comprising the steps of:

illuminating a surface of an object capable of diffusely reflecting radiation, said radiation being one of ultraviolet radiation, visible radiation, and infrared radiation;

receiving an image of said surface on two or more detector arrays, including the steps of:
receiving said reflected radiation through an aperture and a lens, and
focusing a portion of said reflected radiation on each of said detector arrays to receive an image;

generating first, second, third, and fourth phase signals in each of said detector arrays;

combining said first and third phase signals to generate said first quasi sinusoidal signal; and combining said second and fourth phase signals to generate said second quasi sinusoidal signal.

14. The method of claim 13, further comprising the steps of:

receiving said reflected radiation at one of said detector arrays having a first period;

filtering said reflected radiation based upon a spatial frequency, said spatial frequency inversely proportional to said first period.

15. The method of claim 13, wherein said aperture and said lens are optically matched with said detector array for substantially eliminating said sinusoidal signals of said phase signals at odd multiples of said spatial frequency excluding said spatial frequency.

* * * * *